Figure 1:
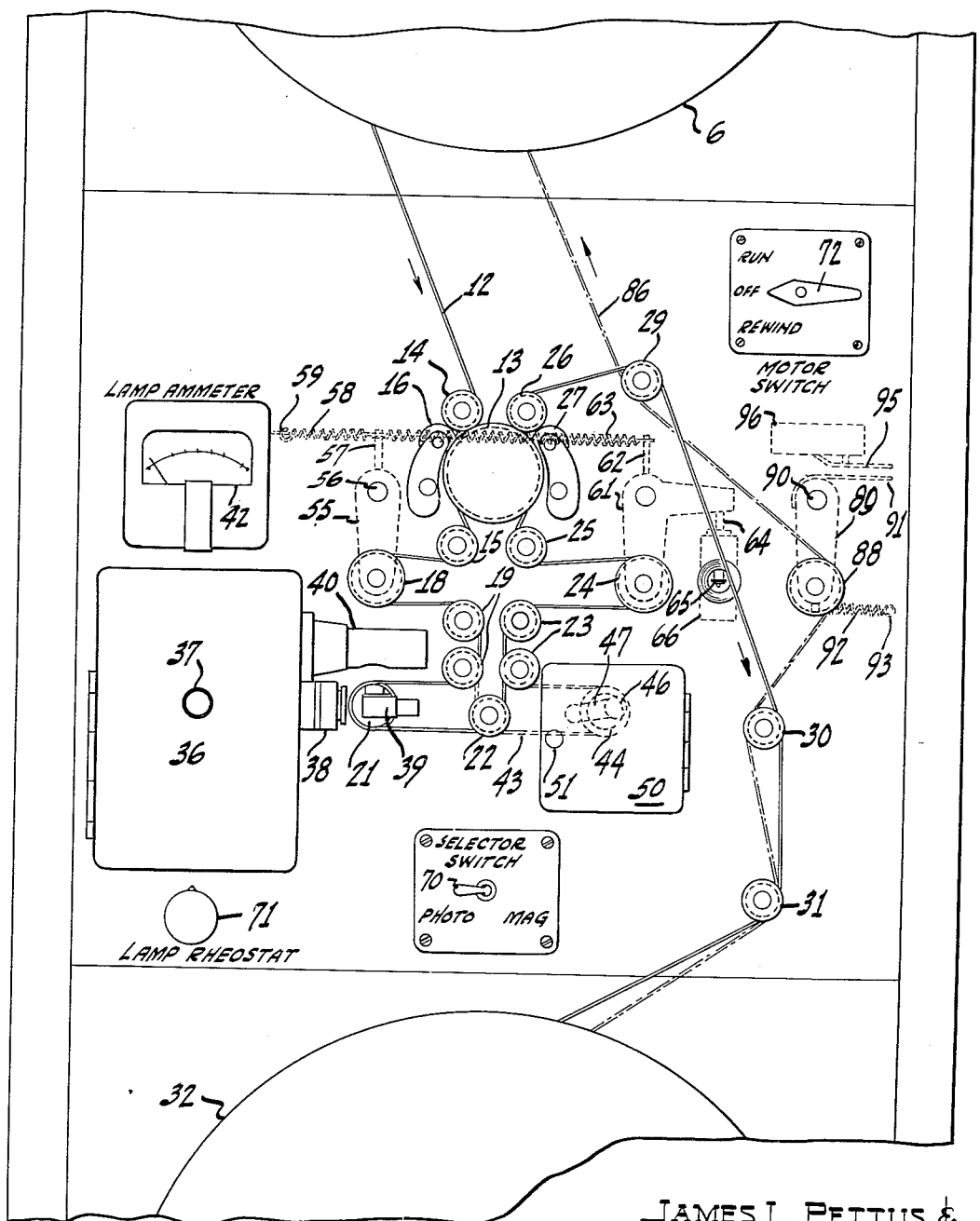

July 12, 1955  J. L. PETTUS ET AL  2,712,941
COMBINATION MAGNETIC AND PHOTOGRAPHIC SOUND
REPRODUCER AND MAGNETIC RECORDER
Filed Dec. 19, 1950  2 Sheets-Sheet 2

JAMES L. PETTUS &
ARTHUR C. ALBEE
INVENTORS

ATTORNEY

United States Patent Office 2,712,941
Patented July 12, 1955

2,712,941

COMBINATION MAGNETIC AND PHOTOGRAPHIC SOUND REPRODUCER AND MAGNETIC RECORDER

James L. Pettus, Encino, and Arthur C. Albee, Hollywood, Calif., assignors to Radio Corporation of America, a corporation of Delaware Application December 19, 1950, Serial No. 201,659

3 Claims. (Cl. 274—11)

This invention relates to a combination magnetic film recorder and reproducer and a photographic sound record reproducer.

With the advent of magnetic sound recording, which appears to be gradually replacing photographic sound recording, the tendency has been to use magnetic record mediums of the same form and size as the prior photographic record mediums. That is, thirty-five millimeter and sixteen millimeter magnetic films or tapes with sprocket tooth perforations are being used. Since magnetic recording may be accomplished in a lighted room, there is also a tendency to construct the magnetic recorders and reproducers in panel form, wherein the reels and film path are easily accessible for threading and observation. However, since there is a great deal of photographic sound records still being used, it is desirable that the magnetic system also provide for the reproduction of photographic film, the panel form of reproducer being adaptable for either photographic or magnetic film reproduction.

The present invention, therefore, is directed to a magnetic sound recording and reproducing system of the panel type, and which is also suitable for the reproduction of photographic film of the same form and size. For instance, the recorder and reproducer of the invention is adaptable for sixteen millimeter film having a single row of sprocket holes, wherein a magnetic sound track may or may not be on the picture medium on the opposite side of the film from the picture emulsion and in the same transverse position on the film. It may be used for thirty-five millimeter film when the proper size spockets and rollers are employed. The system has a symmetrical form of film drive of the general type disclosed and claimed in co-pending application, Ser. No. 201,658, filed December 19, 1950, now Patent No. 2,687,882, whereby a particularly uniform film motion is obtained at either the magnetic or photographic translation point. The system also uses a film reel drive such as disclosed in co-pending application, Ser. No. 193,109, filed October 31, 1950, now Patent No. 2,657,870, while the adjustable magnetic head mounting is of the type disclosed and claimed in co-pending application, Ser. No. 177,463, filed August 3, 1950. Another feature embodied in the present equipment is the optical system for the photographic film reproducer, which is disclosed and claimed in U. S. Patent No. 2,508,888 of May 23, 1950. This optical feature permits a rapid shift of the focal point of the scanning optics from one side of the film to the other, depending upon which side carries the emulsion of the photographic sound record.

The principal object of the invention, therefore, is to facilitate the recording and reproducing of magnetic sound records and the reproduction of a photographic sound record.

Another object of the invention is to provide an improved magnetic sound recorder and reproducer capable of reproducing a photographic sound record.

A further object of the invention is to provide an improved magnetic and photographic film drive suitable for recording and reproducing a magnetic record and for reproducing a photographic record.

Figure 2:
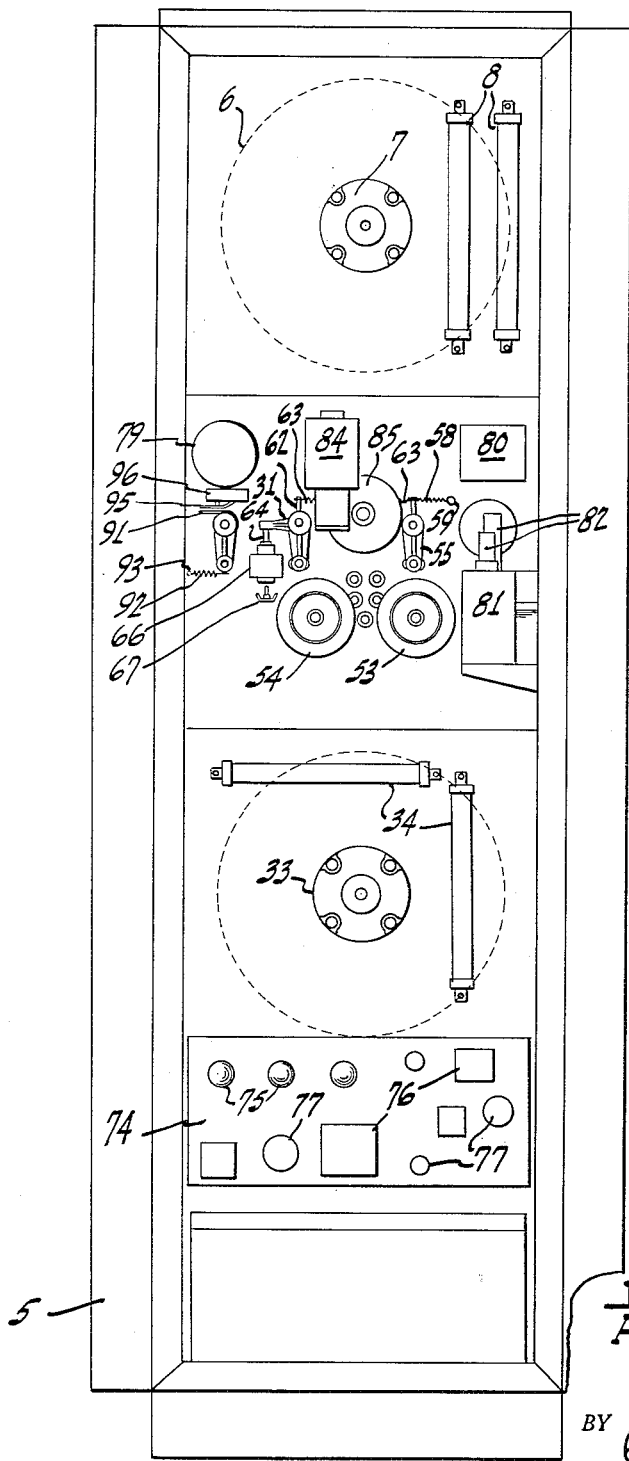

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a front elevational view of the invention showing the film paths for both magnetic and photographic records, and Fig. 2 is a rear elevational view of the panel supporting the equipment of Fig. 1.

Referring now to the drawings, in which the same numerals identify like elements, a rack 5 has mounted thereon a plurality of individual panels to which are mounted various components of the system of the invention. Referring to both Figs. 1 and 2 simultaneously, a supply reel 6, controlled by a torque motor 7 in accordance with the above-mentioned co-pending application has control resistors 8 and is mounted on the top panel section. A film 12 from a roll on reel 6 is advanced in the direction shown by the arrow to a sprocket 13, the film first passing on the left-hand side of the sprocket around fixed guide rollers 14 and 15 and under an adjustable pad roller 16. The film then passes around a tensioned filter roller 18 and then around to fixed guide rollers 19. If the film is photographic, it will then pass around a drum 21, then around a fixed guide roller 22, then past fixed guide rollers 23, around a tensioned filter roller 24, and then past the right-hand side of sprocket 13. The film is guided by fixed rollers 25 and 26, and held on sprocket 13 by adjustable pad roller 27. From the roller 26, the film is guided around a fixed roller 29, a fixed roller 30, a fixed roller 31, to a reel 32, driven by another torque motor 33. This torque motor has resistors 34.

The above film path just traced is for photographic film which is to be reproduced, the usual photographic reproducing elements being an exciter lamp within a housing 36 having a tell-tale lamp 37, a focused optical system 38, a light reflecting optical unit 39, and a photoelectric cell 40. The film overhangs the edge of the drum 21, so that light may pass through the sound track thereof and be received on the photoelectric cell 40. The amount of current being supplied to the lamp is shown by ammeter 42, while the lamp rheostat is shown at 71.

The path for the magnetic film is substantially the same as just traced for the photographic film, but, as shown by the dotted lines 43, the magnetic film, after passing fixed guide rollers 19, passes around fixed roller 22, then over a drum 44, and then back around fixed rollers 23. The magnetic head 46 in an adjustable support 47 contacts the overhanging edge of the magnetic film as disclosed and claimed in my above mentioned co-pending application, Ser. No. 177,463, filed August 3, 1950. The drum 44, head 46, and bracket 47 are shown in dotted lines, since they are enclosed within a shielding mumetal case 50 having a handle 51 on the door thereof.

On the ends of the shafts of each of drums 21 and 44 are flywheels 53 and 54, respectively. This is part of the filter system, the remaining portion being connected to the filter rollers 18 and 24. Roller 18 is mounted on an arm 55, pivoted at 56, and having an extension 57, to which is attached two tensioning springs 58 and 63, spring 58 being anchored at 59, and spring 63 interconnecting extension 57 and an extension 62 from crank arm 61 of roller 24. The film loops between rollers 15—25 and 19—23 are thus tensioned by spring 63, spring 58 stabilizing the position of the rollers. To provide the proper damping for the roller 24 in the pulling loop of the film path, the other end of crank arm 61 is attached to a rod 64 connected to a piston 65 in a dashpot casing 66. This dashpot may be of the same type as that shown in my co-pending application, Ser. No. 201,658, filed December 19, 1950, now Patent No. 2,687,882, wherein the casing 66 is of transparent plastic or glass and is illuminated by a lamp 67 to make visible the position of the piston 65 through an opening in the panel under threading and operating conditions.

Thus, during the recording and reproducing of magnetic film, the drum 44 with its flywheel 54 is used in conjunction with the tensioned rollers 18 and 24, roller 24 being damped by dashpot 66, to provide uniform film motion at the gap of magnetic head 46. During the reproduction of photographic film, the drum 21 with its flywheel 53 is used in conjunction with the tensioned rollers 18 and 24 and dashpot 66 to provide uniform film motion at the photographic translation point. Thus, by shifting the film path on either side of roller 22, the same filtering is obtainable to advance either photographic or magnetic film at a uniform rate at their respective translation points.

To control the system, a selector switch 70 connects the proper electrical power circuits to the exciter lamp and photoelectric cell or to the magnetic head according to which type of film is being used. The motor switch is shown at 72. In Fig. 2, the oscillator and pre-amplifier panel is shown at 74 with its tubes 75, transformers 76, condensers 77, and other elements required. The back of the motor switch is shown covered by a shield 79, while 80 is a terminal box and 81 is a phototube pre-amplifier with its tubes 82. A motor 84 drives the sprocket 13 through reduction gear box 85. These elements are mounted on their respective panels so that any component may be removed with facility for inspection and repair.

Also shown in Fig. 1 is a rewind path for either photographic or magnetic film, this path being shown in the dot and dash lines 86. The path for rewinding the film is from the reel 32, around the roller 31, roller 30, around a switch control roller 88 mounted on an arm 89 pivoted at 90, and having a switch actuating arm 91. The film then passes around roller 29 to the reel 6. The arm 89 for the roller 88 is connected to a spring 92 anchored at 93, this spring, when film is not being advanced over roller 88, moving the arm 91 in contact with an arm 95 of a microswitch 96. That is, the microswitch 96 has its electrical contact closed when a film is around roller 88, as shown in Fig. 1, but when the arm 95 is actuated by the arm 91, this contact is broken to de-energize the rewinding motor 7.

The above described combination magnetic and photographic reproducer and magnetic recorder uses the same type of film path with the same filtering, regardless of whether magnetic or photographic film is being advanced through the mechanism. In doing this, the photographic reproducing portion is completely spaced and isolated from the magnetic portion of the system. This prevents interference between these portions and permits each to be designed to provide high quality performance.

The film path is substantially symmetrical above the guide roller 22 and up to the sprocket, the axes of the drums being in a plane parallel with the normal plane of the filtering rollers. The plane of the axes of the sprocket and guide roller 22 are perpendicular to drum axes and the plane of the axes of the filtering roller and intersect these planes at points substantially mid-way between the respective axes. At the roller 22, the two film paths might be said to be the reflections of one another.

We claim:

1. A symmetrical film path advancing mechanism for sound record reproduction comprising a sprocket for advancing film at two positions thereon to form a loop, a sound record reproducing unit including a drum over the end of which a film is adapted to extend, a sound record reproducing unit including a second drum over the end of which a film is adapted to extend, a pair of filtering rollers adjacent said sprocket for tensioning the film in said loop, a guide roller for guiding said film to one of said drums at mutually exclusive times, said film having the same length between said guide roller and said drums at each of said times, the axes of said drums being in one certain plane, the axis of said sprocket being in a plane perpendicular to said drum axes plane at a point midway between said drum axes, the normal plane of said filtering rollers being parallel with said drum axes plane and said filtering rollers tensioning said film away from said sprocket axis plane, said sprocket axis plane intercepting the plane of said roller axes at a point substantially midway between the axes of said rollers, and tensioning means having a fixed anchor for said filtering rollers, together with a directly connected damper for one of said rollers, the damping of the filtering being applied with the same efficiency regardless of the direction of film travel in said loop.

2. A symmetrical film path advancing mechanism in accordance with claim 1, in which the axis of said guide roller is at substantially the intersection of the plane of said sprocket and the plane of said drums.

3. A symmetrical film path advancing mechanism in accordance with claim 1, in which a supply reel and a takeup reel are provided, together with rollers for guiding film from said sprocket to said takeup reel, said rollers also guiding film from said takeup reel to said supply reel during the rewinding of said film.

References Cited in the file of this patent

UNITED STATES PATENTS

| 1,831,562 | Heisler | Nov. 10, 1931 |
|---|---|---|
| 1,909,074 | Reynolds | May 16, 1933 |
| 2,091,692 | Scott | Aug. 31, 1937 |
| 2,242,574 | Eggert | May 20, 1941 |
| 2,349,018 | Tasker | May 16, 1944 |
| 2,532,761 | Dablasio | Dec. 5, 1950 |
| 2,535,486 | Dank | Dec. 26, 1950 |
| 2,550,916 | Davis | May 1, 1951 |
| 2,560,395 | Steed | July 10, 1951 |
| 2,562,379 | Davis | July 31, 1951 |

FOREIGN PATENTS

| 57,571 | Denmark | May 6, 1940 |
|---|---|---|

OTHER REFERENCES

Publication I—"35 Hm. Magnetic Recording System," by Earl Masterson in the "Journal of the Society of Motion Picture Engineers," volume 51, November 5, 1948; pages 481–488. Copy available in Patent Office, Division 16.

Publication II—"Supplementary Magnetic Facilities for Photographic Sound Systems," by G. R. Crane et al. in the "Journal of the Society of Motion Picture Engineers," volume 54, Number 3, March 1950; pages 315–327. Copy available in Scientific Library.